United States Patent
Nava Reyes

(10) Patent No.: US 12,466,341 B2
(45) Date of Patent: Nov. 11, 2025

(54) LICENSE PLATE FRAME

(71) Applicant: NISSAN NORTH AMERICA, INC., Franklin, TN (US)

(72) Inventor: Emmanuel Agustin Nava Reyes, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 191 days.

(21) Appl. No.: 18/186,547

(22) Filed: Mar. 20, 2023

(65) Prior Publication Data

US 2024/0317151 A1 Sep. 26, 2024

(51) Int. Cl.
*G09F 13/16* (2006.01)
*B60R 11/00* (2006.01)
*B60R 13/10* (2006.01)

(52) U.S. Cl.
CPC ................................. *B60R 13/105* (2013.01)

(58) Field of Classification Search
CPC .............. B60R 13/105; G09F 15/0068; G09F 15/0025; G09F 2007/1895; G09F 15/0062
See application file for complete search history.

(56) References Cited

U.S. PATENT DOCUMENTS

| | | | | | |
|---|---|---|---|---|---|
| 1,519,575 A | * | 12/1924 | Trevalyn | ................... | B60R 7/04 40/784 |
| 1,520,324 A | * | 12/1924 | Borreson | .............. | B60R 13/105 40/202 |
| 2,389,897 A | * | 11/1945 | Davis | .................... | B60R 13/105 24/462 |
| 2,499,747 A | * | 3/1950 | Griffith | ................. | B60R 13/105 24/339 |
| 2,696,058 A | * | 12/1954 | Beyer | ................... | B60R 13/105 40/739 |
| 2,916,842 A | * | 12/1959 | Mushynski | ........... | B60R 13/105 40/202 |
| 3,184,366 A | * | 5/1965 | Claude | .................... | A47F 5/108 40/571 |
| 3,685,666 A | * | 8/1972 | Rose | ................... | G09F 15/0068 40/605 |
| 3,977,683 A | * | 8/1976 | Tomura | ................... | A63F 9/088 473/612 |
| 4,817,319 A | * | 4/1989 | Vitale | ..................... | E01F 9/658 40/610 |
| 4,888,895 A | * | 12/1989 | Kemeny | ............. | G09F 15/0068 52/109 |

(Continued)

FOREIGN PATENT DOCUMENTS

DE 102010009798 A1 9/2011
WO 2018/129487 A2 7/2018

*Primary Examiner* — Shin H Kim
(74) *Attorney, Agent, or Firm* — Global IP Counselors, LLP

(57) ABSTRACT

A license plate frame is defined by a frame structure that includes a top member, a first side member, a bottom member and a second side member connected to one another for pivotal movement with respect to one another. In response to pivoting movement of the top member relative to the first and second side members and pivoting movement of the bottom member relative to the first and second side members, the frame structure is moved between a first orientation wherein the frame structure has an overall rectangular shape and a second orientation wherein the frame structure has a folded overall linear shape.

16 Claims, 8 Drawing Sheets

(56) References Cited

U.S. PATENT DOCUMENTS

| | | | | |
|---|---|---|---|---|
| 5,351,843 A * | 10/1994 | Wichman | ............ | G09F 15/0062 |
| | | | | 211/195 |
| 5,483,779 A | 1/1996 | Crawford et al. | | |
| 5,704,164 A * | 1/1998 | Huang | ...................... | E06B 9/02 |
| | | | | 49/55 |
| 5,903,993 A * | 5/1999 | Maticko | .................. | G09F 17/00 |
| | | | | 248/479 |
| 6,273,583 B1 * | 8/2001 | Trisler | ...................... | F21S 4/20 |
| | | | | 362/121 |
| 6,553,698 B1 * | 4/2003 | Kemeny | ............. | G09F 15/0068 |
| | | | | 52/646 |
| 7,802,390 B2 * | 9/2010 | Reis | ...................... | A47G 1/142 |
| | | | | 40/781 |
| 7,946,544 B2 | 5/2011 | Benshetrit | | |
| 9,003,683 B1 * | 4/2015 | Feliciano | ............ | G09F 15/0025 |
| | | | | 40/610 |
| 9,802,440 B2 | 10/2017 | Lu | | |
| 10,982,426 B2 * | 4/2021 | Turner | ...................... | F16S 3/08 |
| 2003/0196360 A1 * | 10/2003 | Colip | ...................... | G09F 13/22 |
| | | | | 40/591 |
| 2007/0095990 A1 * | 5/2007 | Park | ...................... | A47C 17/70 |
| | | | | 248/200 |
| 2011/0283574 A1 * | 11/2011 | Ellman | ................... | B60R 13/10 |
| | | | | 40/209 |

* cited by examiner

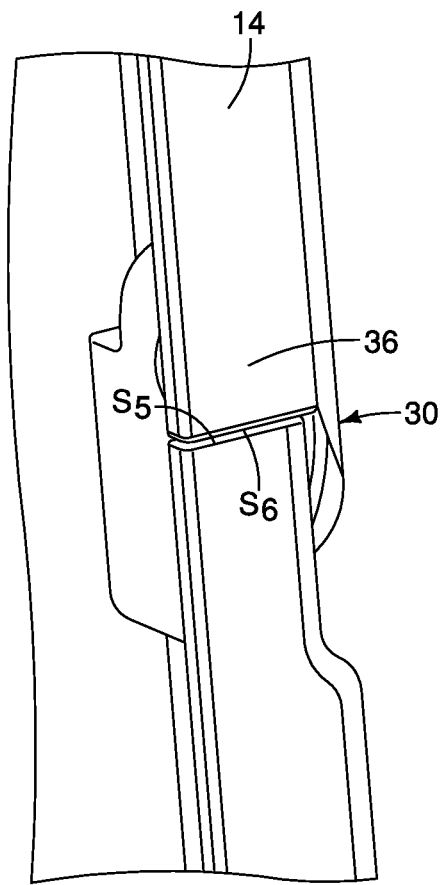
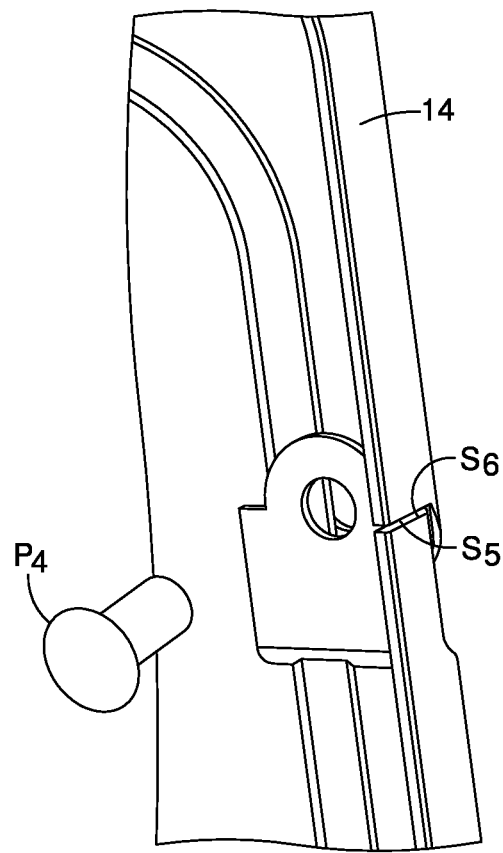
FIG. 9    FIG. 10
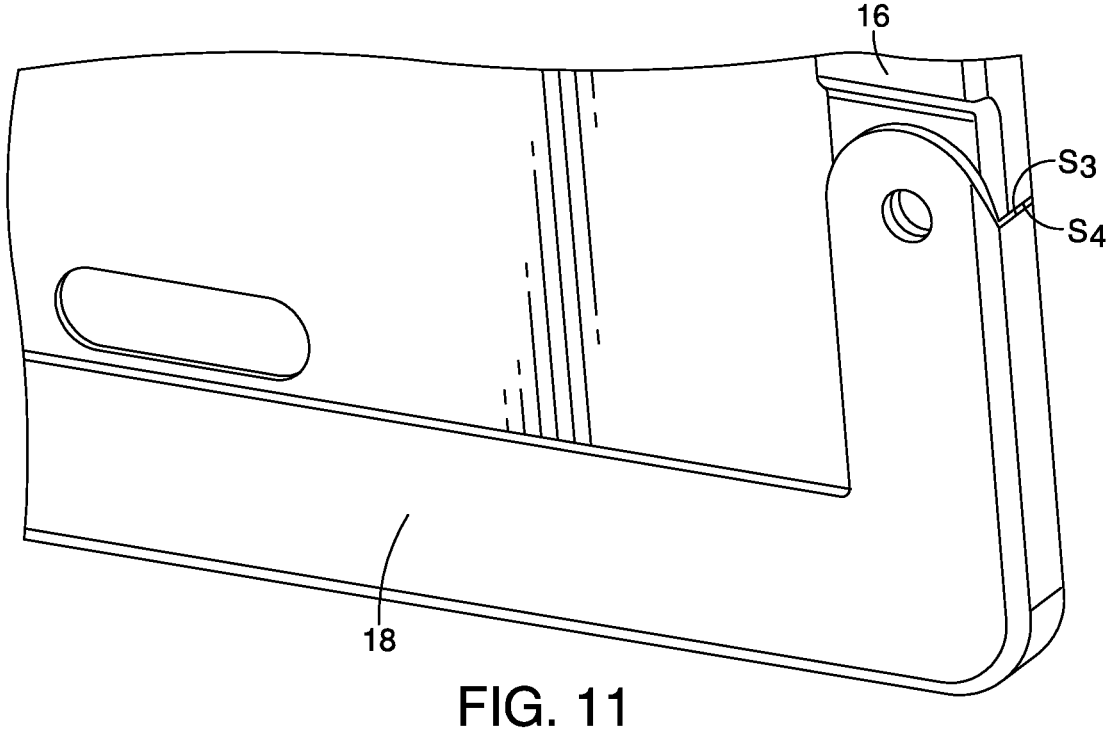
FIG. 11

LICENSE PLATE FRAME

BACKGROUND

Technical Field

The present disclosure generally relates to a license plate frame. More specifically, the present disclosure relates to a license plate frame that can be folded between an in-use orientation and a folded orientation.

Background Information

License plate frames are typically rigid structures with a central open area through which a license plate is visible. Storing and shipping such license plate frames takes up storage volume and shipping container volume that is far greater that the actual overall volume of the license plate frame.

SUMMARY

It has been discovered that a folding license plate frame takes up very little storage space and shipping container space as compared to a traditional rigid rectangular shaped license plate frame.

In view of the state of the known technology, one aspect of the present disclosure is to provide a license plate frame that is defined by a frame structure. The frame structure includes a top member, a first side member, a bottom member and a second side member connected to one another for pivotal movement with respect to one another. In response to pivoting movement of the top member relative to the first and second side members and pivoting movement of the bottom member relative to the first and second side members, the frame structure is moved between a first orientation wherein the frame structure has an overall rectangular shape and a second orientation wherein the frame structure has a folded overall linear shape.

BRIEF DESCRIPTION OF THE DRAWINGS

Referring now to the attached drawings which form a part of this original disclosure:

FIG. 9 is a rear or back side perspective view of a portion of the left-hand side of the frame assembly in the first orientation (an in-use orientation) in accordance with the exemplary embodiment;

FIG. 10 is another rear or back side perspective view of the portion of the frame assembly depicted in FIG. 9 in the first orientation (the in-use orientation) in accordance with the exemplary embodiment;

FIG. 11 is a perspective view of a lower right-hand side of the frame structure in accordance with the exemplary embodiment;

DETAILED DESCRIPTION OF EMBODIMENTS

Figure 1:
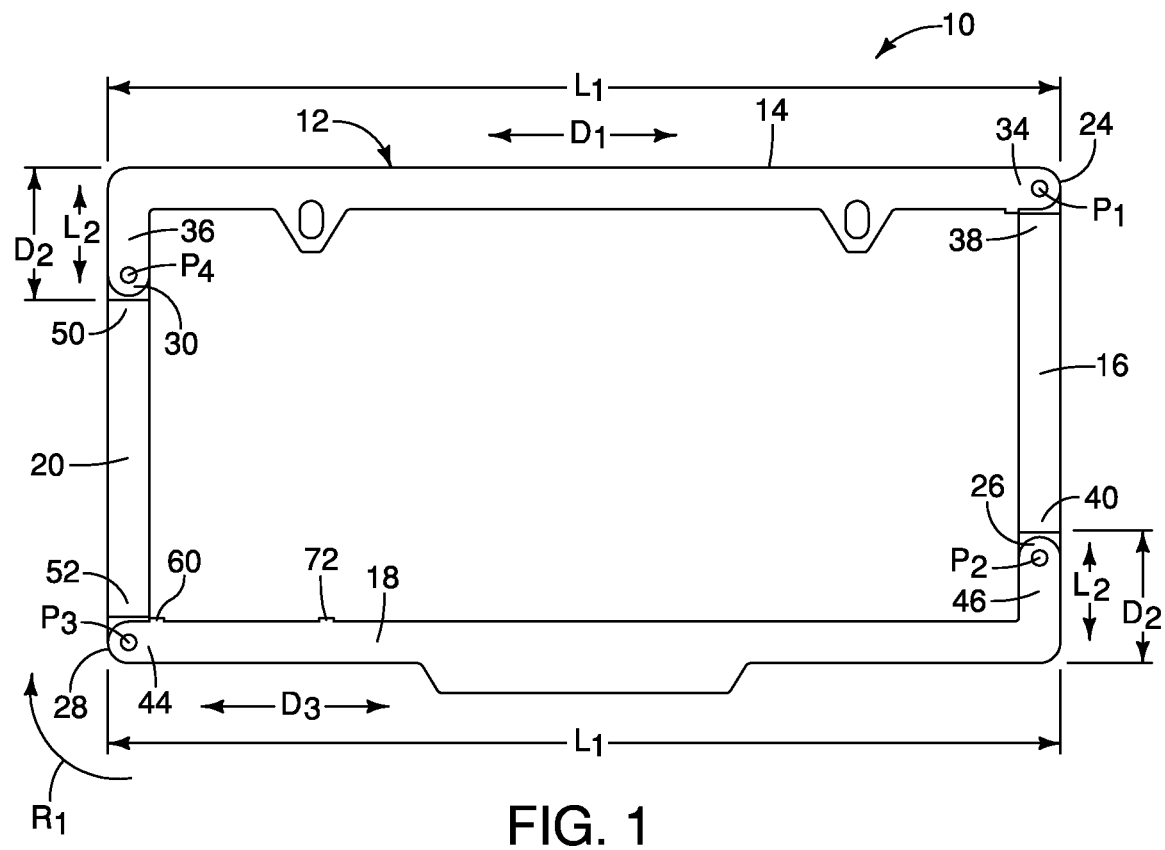
FIG. 1 is a front view of a license plate frame having a rectangularly shaped frame assembly that is foldable between a first orientation shown in FIG. 1 and a folded orientation (FIGS. 3 and 4) in accordance with an exemplary embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-17, a license plate frame 10 that is foldable is illustrated in accordance with a first embodiment.

The license plate frame 10 includes a frame structure 12 that includes a top member 14, a first side member 16, a bottom member 18 and a second side member 20.

The top member 14 and the first side member 16 are attached to one another via a pivot pin $P_1$ for pivotal movement at a first hinge area 24 (also referred to as a connecting area). The first side member 16 and the bottom member 18 are attached to one another via a pivot pin $P_2$ for pivot movement at a second hinge area 26 (also referred to as a connecting area). The bottom member 18 and the second side member 20 are attached to one another via a pivot pin $P_3$ for pivot movement at a third hinge area 28. Further, the second side member 20 and the top member 14 are attached to one another via a pivot pin $P_4$ for pivot movement at a fourth hinge area 30.

Put another way, the top member 14, the first side member 16 and the second side member 20 are connected to one another for pivotal movement with respect to one another. In response to pivoting movement of the top member 14 relative to the first and second side members 16 and 20, and pivoting movement of the bottom member 18 relative to the first and second side members 16 and 20, the frame structure 12 move between a first orientation (FIG. 1) wherein the frame structure has an overall rectangular shape and a second orientation (FIGS. 3 and 4) wherein the frame structure 12 has a folded overall linear shape. In the second orientation (the folded overall shape), the frame structure 12 has an overall linear shape that takes up less volume than in the first orientation. More specifically, when boxed for shipping and/or storage the folded frame structure 12 (second orientation) requires less storage that when in the first orientation.

Figure 2:
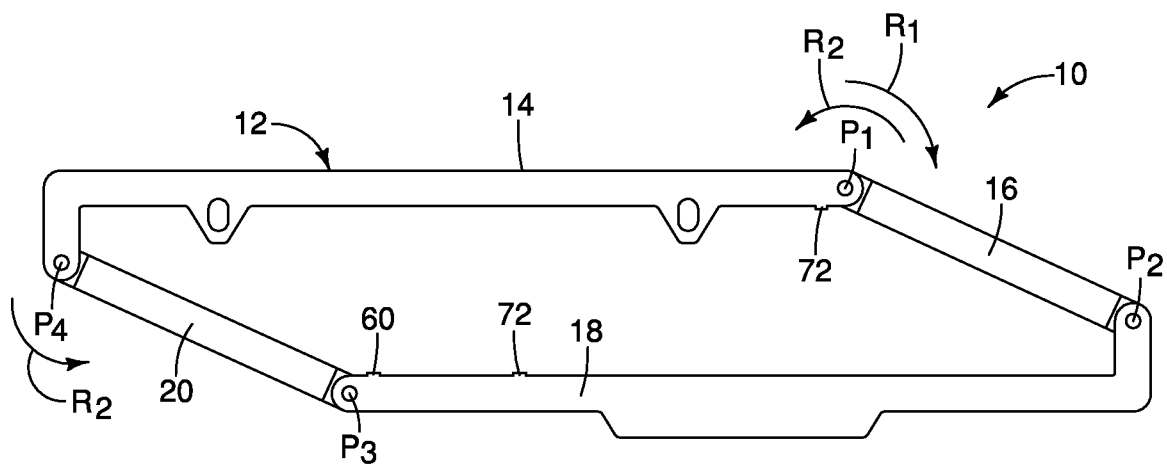
FIG. 2 is another front view of the frame assembly folded to an intermediate orientation between the first orientation a second orientation (the folded orientation) in which the frame assembly has an overall parallelogram shape in accordance with the exemplary embodiment.
Figure 3:
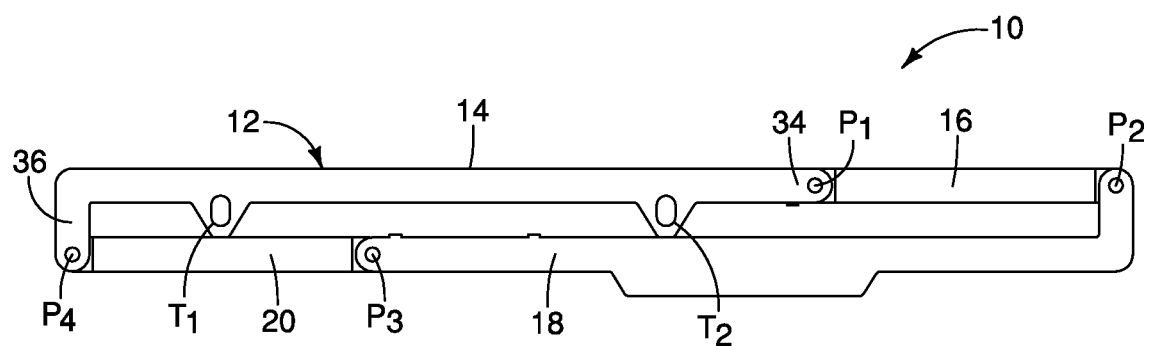
FIG. 3 is another front view of the frame assembly folded the second orientation (the folded orientation) in which the frame assembly has an overall linear shape in accordance with the exemplary embodiment.
Figure 4:
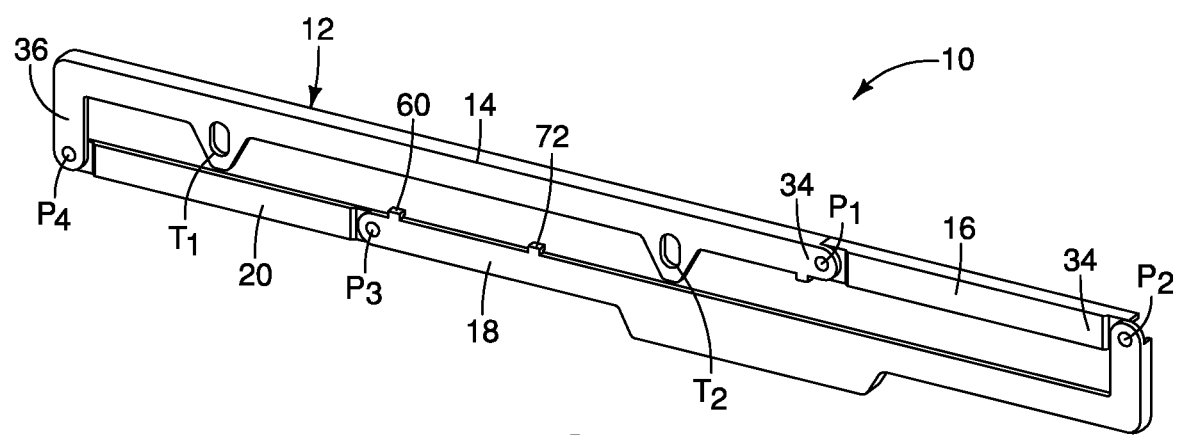
FIG. 4 is a perspective view of the frame assembly folded the second orientation (the folded orientation) in which the frame assembly has an overall linear shape in accordance with the exemplary embodiment.

As shown in FIG. 2, during movement between the first and second orientations, the frame structure 12 has the appearance of a parallelogram. FIG. 2 shows the frame structure 12 in an intermediate orientation mid-way between the first orientation (FIG. 1) and the second orientation (FIGS. 3 and 4).

Figure 5:
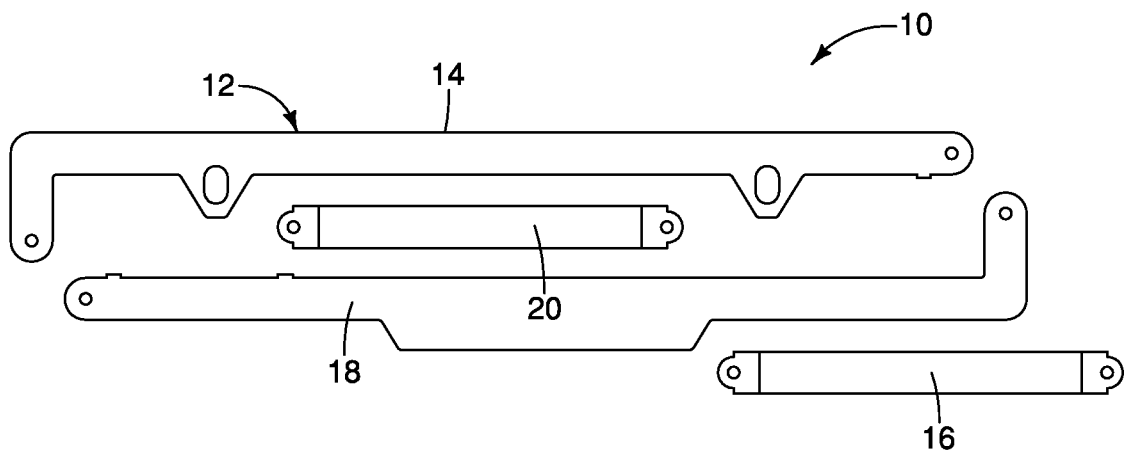
FIG. 5 is a front view of the frame assembly in a dis-assembled state showing a top member, first and second side members and a bottom member in accordance with the exemplary embodiment.
Figure 6:
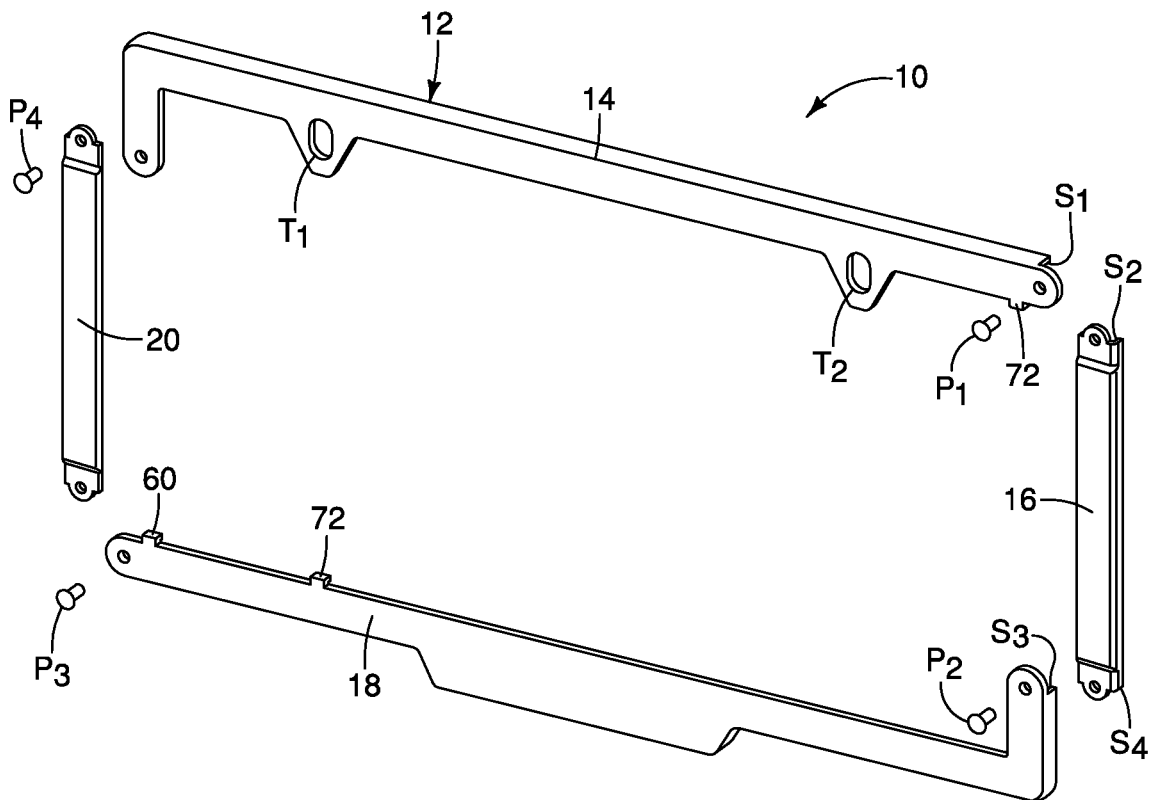
FIG. 6 is a perspective view of the frame assembly in the dis-assembled state showing the top member, the first and second side members and the bottom member in locations that are close to their assembled locations relative to one another in accordance with the exemplary embodiment.

The top member 14 extends in a first direction $D_1$ and includes a first end 34 and a second end 36. The top member 14 further defines a first main portion 38 that extends from the first end 34 to the second end 36. The first main portion 38 and the second end 36 define an L-shape, as shown in FIGS. 5 and 6.

The first main portion 38 has a first overall length $L_1$ measured along the first direction $D_1$ and the second end 36 of the top member 14 has a second overall length $L_2$ measured along a second direction $D_2$. The first overall length $L_1$ is several times the second overall length $L_2$. In the depicted embodiment the first overall length $L_1$ is at least five times the second overall length $L_2$ but can be six or up to seven and a half times the second overall length $L_2$.

The first side member 16 has a first end 38 and a second end 40 and extends in the second direction $D_2$ perpendicular to the first direction $D_1$ with the frame structure 12 in the first orientation (FIG. 1). The first end 38 of the first side member 16 is connected to the first end 34 of the top member 14 for pivotal movement about the pin $P_1$. The first side member 16 is generally straight.

The bottom member 18 has a first end 44 and a second end 46. The bottom member 18 extends in a third direction $D_3$ that is parallel to the first direction $D_1$. The second end 46 of the bottom member 18 extending in a fourth direction $D_4$ that is parallel to the second direction $D_2$ with the frame structure 12 fully assembled. The second end 46 of the bottom member 18 is attached to the second end 40 of the first side member 16 for pivotal movement about a second hinge area 26, which includes the pin $P_2$. The bottom side member 18 extends in directions that are always parallel to the direction that the top member 14 extends with the frame structure 12 fully assembled, regardless of the orientation of the frame structure 12.

The second side member 20 is generally identical to the first side member 16. The second side member 20 has a first end 50 and a second end 52. The second side member 20 extends in directions that are always parallel to the direction that the first side member 16 extends with the frame structure 12 fully assembled, regardless of the orientation of the frame structure 12. The first end 50 of the second side member 20 is connected to the first end 44 of the bottom member 18 for pivotal movement about the pin $P_3$. The second end 52 of the second side member 20 is connected to the second end of the top side member 14 via the pivot pin $P_4$. The second side member 20 is generally straight.

It should be understood from the description above and the drawings that the first hinge area 24 defines a connection area between the top member 14 and the first side member 16. The second hinge area 26 defines a connection area between the first side member 16 and the second end 46 of the bottom member 18. Similarly, the third hinge area 28 defines a connection area between the bottom member 18 and the second side member 20 and the fourth hinge area 30 defines a connection area between the top member 14 and the second side member 20.

As shown in FIG. 6, the second end 36 of the top member 14 defines a first stop surface $S_1$ proximate the connecting area where the pivot pin $P_1$ connects the top member 14 to the first side member 16. Similarly, the first end 38 of the first side member 16 defines a second stop surface $S_2$ proximate the connecting area where the pivot pin $P_1$ connects the top member 14 to the first side member 16. When the frame structure 12 is folded to the second orientation (FIGS. 3, 4 and 8), the first and second stop surfaces $S_1$ and $S_2$ contact one another thereby preventing movement of the frame structure 12 beyond the second orientation (a second pivoting direction $R_2$).

Figure 8:
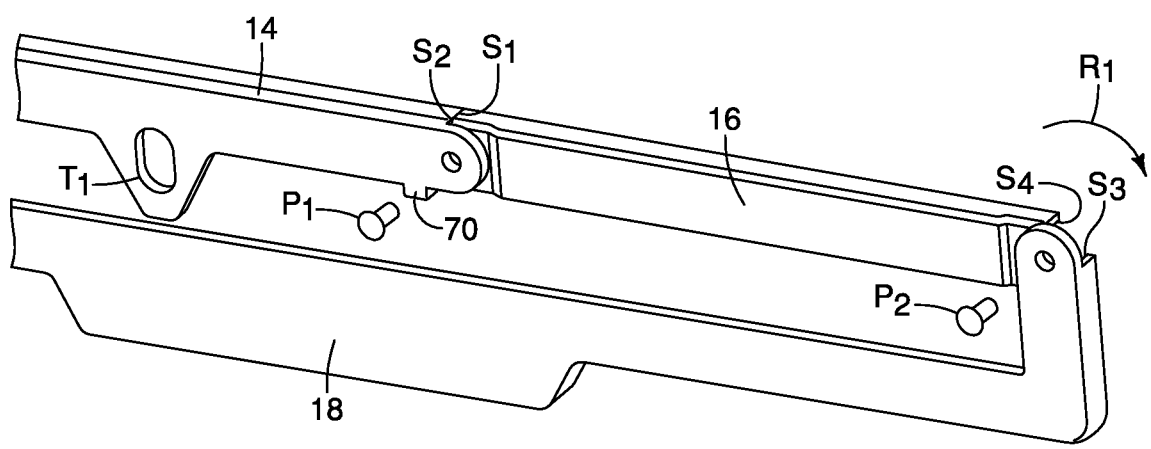
FIG. 8 is another partial perspective view of a right-hand portion of the frame assembly in the second orientation (the folded orientation) in accordance with the exemplary embodiment.

As shown in FIG. 8, the second end 46 of the bottom member 18 includes a third stop surface $S_3$ and the second end 40 of the first side member 16 includes a fourth stop surface $S_4$. When the frame structure 12 is in the first orientation (FIGS. 1 and 11), the third stop surface $S_3$ and the fourth stop surface $S_4$ contact one another thereby preventing movement of the frame structure 12 beyond the first orientation (a first pivoting direction $R_1$).

Figure 7:
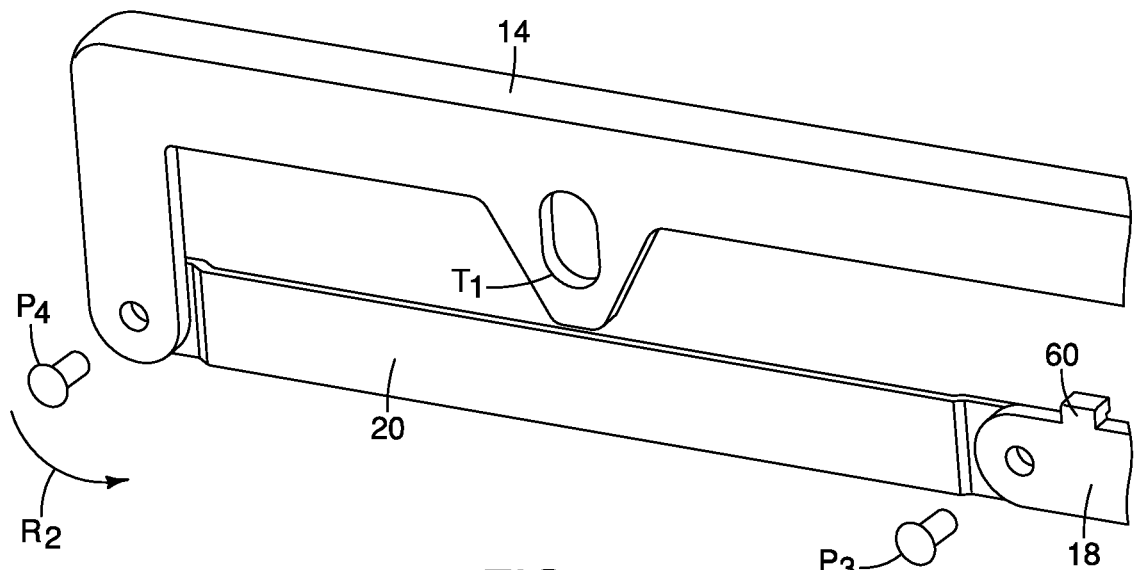
FIG. 7 is a partial perspective view of a left-hand portion of the frame assembly in the second orientation (the folded orientation) in accordance with the exemplary embodiment.
Figure 12:
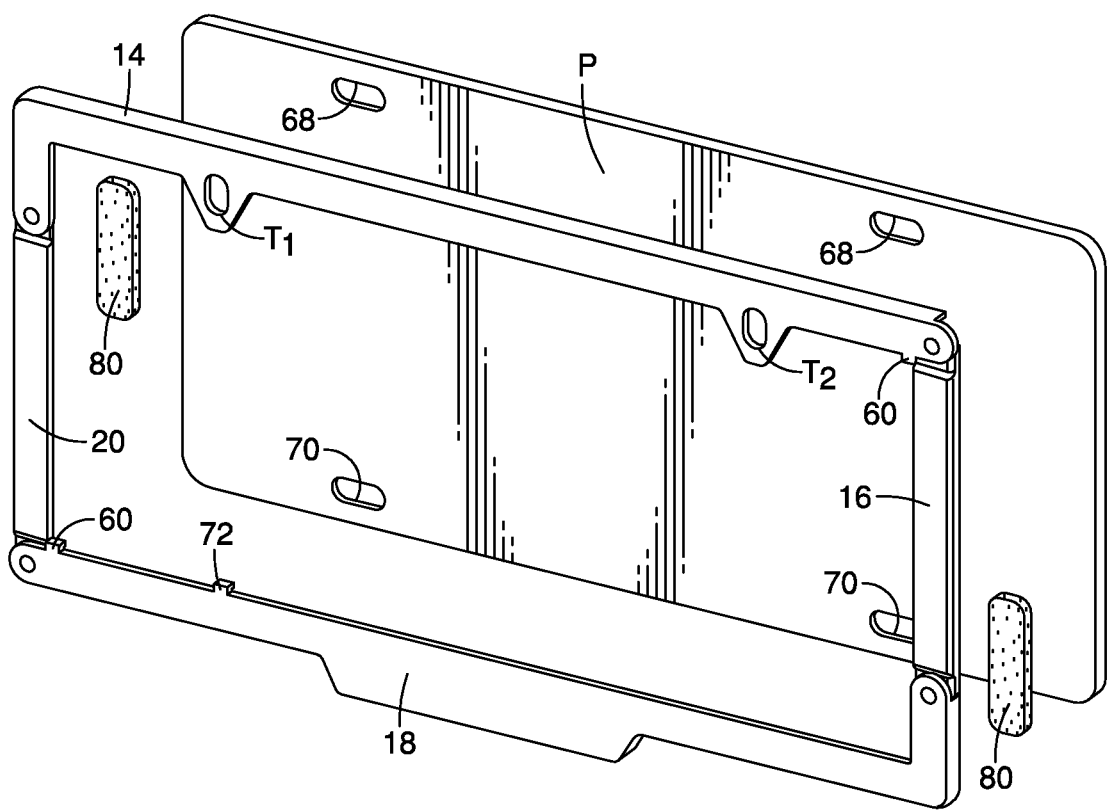
FIG. 12 is an exploded perspective view of the frame structure with a license plate and cushioning members in accordance with the exemplary embodiment.
Figure 13:
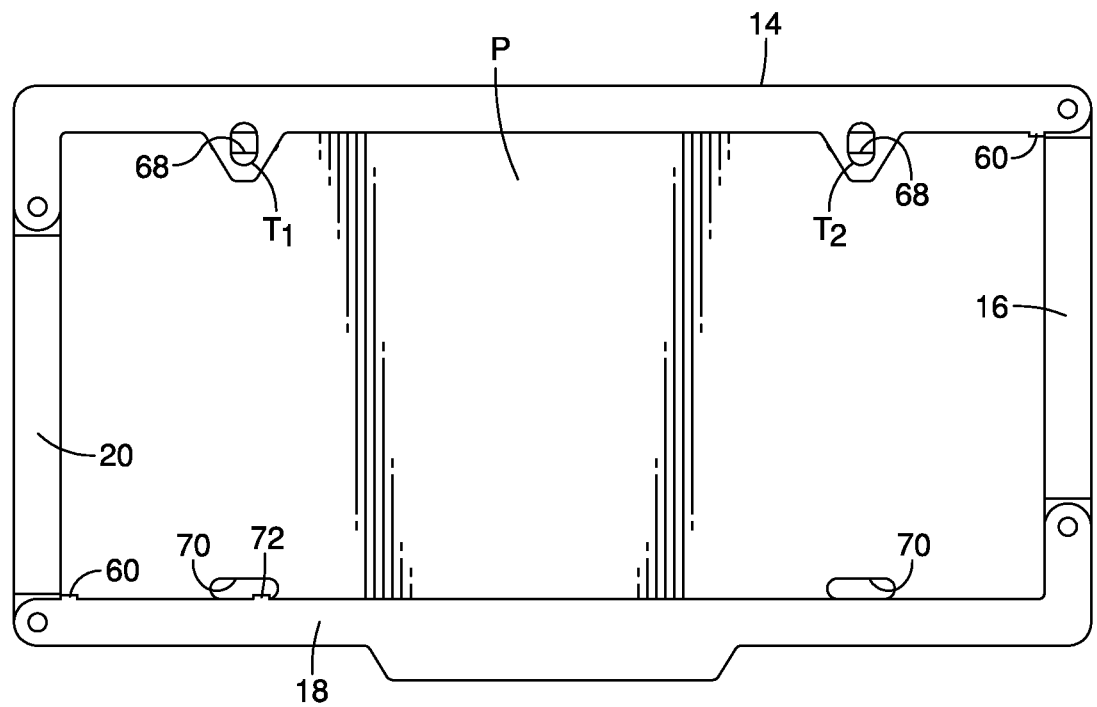
FIG. 13 is a front view of the frame structure with the license plate attached thereto in accordance with the exemplary embodiment.

As shown in FIGS. 1, 2 and 7, the first end 44 of the bottom member 18 includes a stop projection 60. The stop projection 60 is positioned such that the stop projection 60 contacts the second side member 20 preventing movement of the frame structure 12 beyond the first orientation (FIG. 1). Similarly, as shown in FIGS. 12-13, the first end 34 of the top member 14 includes another stop projection 60. The stop projection 60 is positioned such that the stop projection 60 contacts the first side member 16 preventing movement of the frame structure 12 beyond the first orientation (FIG. 1).

As shown in FIG. 9, the second end 40 of the top member 14 includes a stop surface $S_5$ and the second side member 20 includes a stop surface $S_6$. When the frame structure 12 is in the first orientation (FIGS. 1 and 9), the stop surface $S_5$ and the stop surface $S_6$ contact one another thereby preventing movement of the frame structure 12 beyond the first orientation (a first pivoting direction $R_1$).

As shown in FIG. 12, the frame structure 12 is shown with a license plate P and cushioning members 80 that can be installed between the license plate P and the frame structure 12. The cushioning members 80 can also include or can be made of a mastic or adhesive material.

With the frame structure 12 in the first orientation (FIGS. 12-17), the frame structure 12 has an overall rectangular shape. Further, the top member 14 is spaced apart from and parallel to the bottom member 18. As well the first side member 16 and the second side member 20 are perpendicular to both the top member 14 and the bottom member 18 and parallel to one another.

Figure 14:
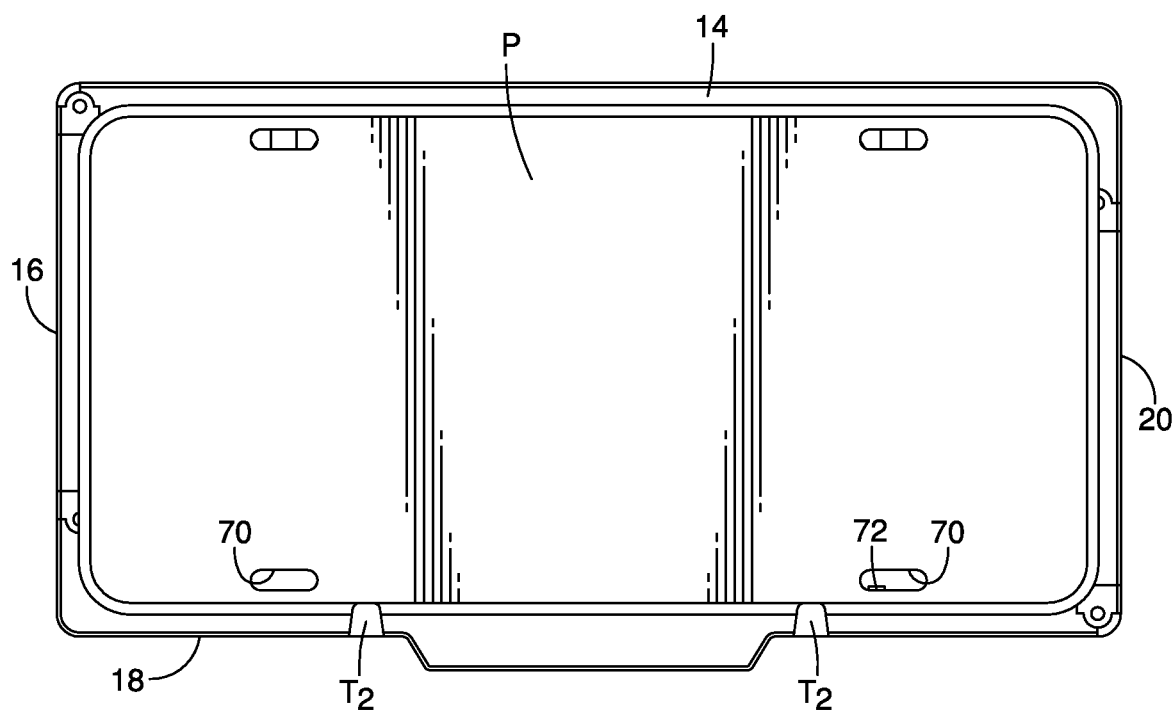
FIG. 14 is a rear view of the frame structure with the license plate attached thereto in accordance with the exemplary embodiment.
Figure 15:
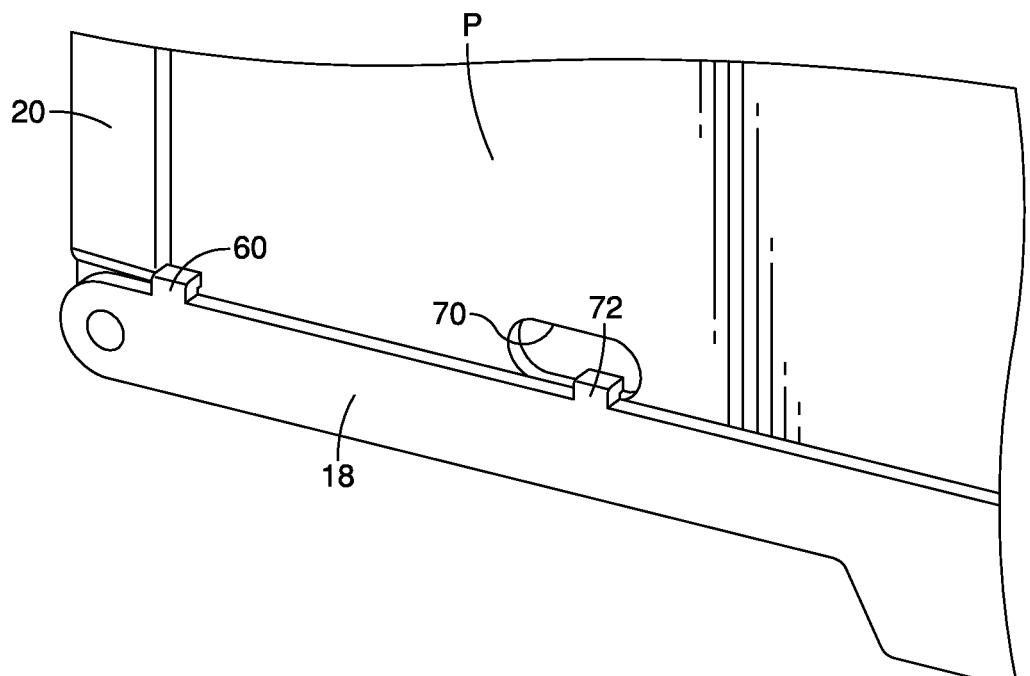
FIG. 15 is a perspective view of a lower left-hand side corner of the frame assembly with the license plate attached thereto in accordance with the exemplary embodiment.
Figure 16:
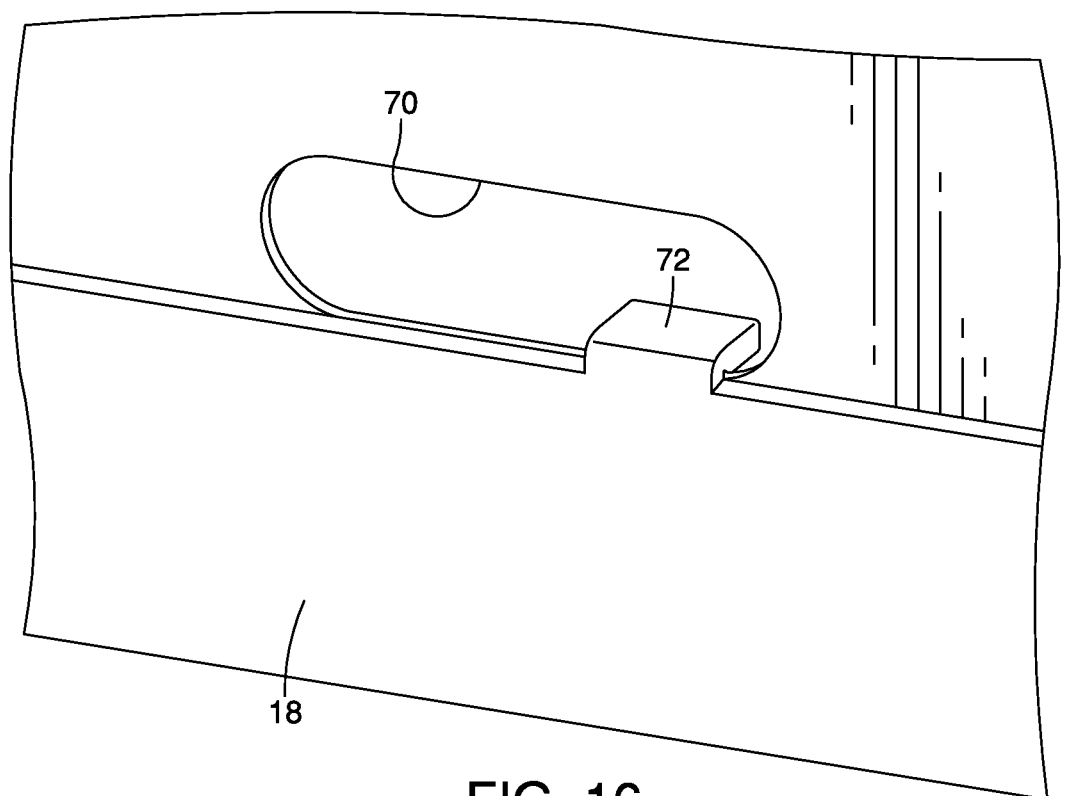
FIG. 16 is another perspective view of a portion of the lower left-hand side corner of the frame assembly showing a rearwardly extending projection of the bottom member of the frame structure extending into an opening along a lower portion of the license plate in accordance with the exemplary embodiment.
Figure 17:
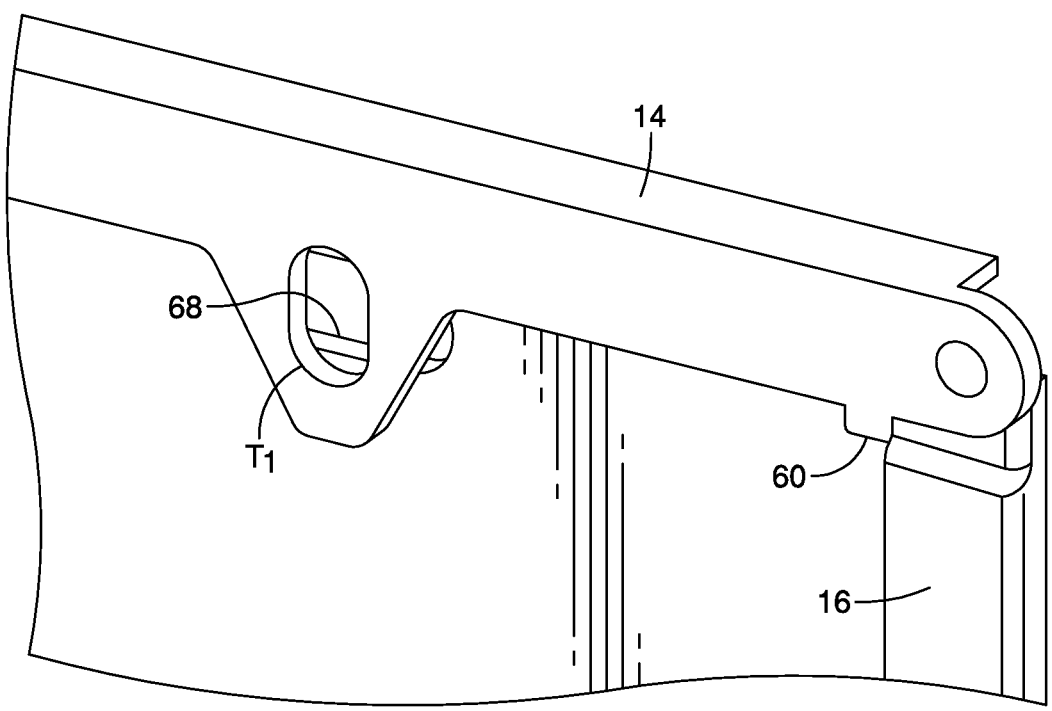
FIG. 17 is a perspective view of a portion of an upper right-hand side corner of the frame assembly showing an opening of the license plate aligned with an opening in a downwardly extending tab of the top member of the frame assembly in accordance with the exemplary embodiment.

As shown in FIGS. 1-8, 11-13 and 15-17, the frame structure 12 has a finished side. As shown in FIG. 14, the frame structure 12 has a back side surface (hidden side). As shown in FIGS. 9-10 and 12-17, the license plate P can be retained along a back side surface of the frame structure 12. Specifically, the top member 14 has two upper tabs $T_1$ that extend downward. The two upper tabs $T_1$ have openings such that mounting bolts (not shown) can extends through the openings in the two upper tabs $T_1$. With the license plate P properly installed to the back side surface of the frame structure, openings 68 of the license plate P align with the openings in the two upper tabs $T_1$. The mounting bolts (not shown) retain an upper edge of the license plate P in position relative to the frame structure 12. Further as shown in FIG. 14, the bottom member 18 has two tabs $T_2$ that extend upward such that the license plate P slips between the two tabs $T_2$ and the back side surface of the frame structure 12 retaining a lower edge of the license plate P against the back side surface of the frame structure 12. As shown in FIGS. 12, 13, 14 and 15, the bottom member 18 includes a projection 72 that extends from an upper edge of the bottom member 18 and extends rearward fitting into one of a pair of lower openings 70 in the license plate P limiting lateral movement of the license plate P relative to the frame structure 12.

With the frame structure 12 in the second orientation (FIGS. 2,3-4 and 7-8) folded into the overall linear shape, at least one the tabs $T_1$ of the top member 14 is located adjacent to a portion of the bottom member 18 and can contact the bottom member 18. Further, the first side member 16 is located adjacent to and parallel to the bottom member 18 and the second side member 20 is located adjacent to and parallel to the top member 14.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the license plate frame. Accordingly, these terms, as utilized to describe the present invention should be interpreted relative to a vehicle equipped with the license plate frame.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A license plate frame comprising:
a frame structure that includes a top member, a first side member, a bottom member and a second side member connected to one another for pivotal movement with respect to one another such that in response to pivoting movement of the top member relative to the first and second side members and pivoting movement of the bottom member relative to the first and second side members causes the frame structure to move between a first orientation wherein the frame structure has a first overall rectangular shape and a second orientation wherein the frame structure has a folded second overall rectangular shape having a smaller volume than the first overall rectangular shape,
the top member extending in a first direction and having an L-shape;
the first side member extending in a second direction perpendicular to the first direction and being pivotally connected to the top member and the bottom member;
the bottom member extending in a third direction parallel to the first direction and having an L-shape; and
the second side member extending in a fourth direction parallel to the second direction and being pivotally connected to the top member and the bottom member.

2. The license plate frame, according to claim 1, wherein
the top member extends in the first direction and includes a first end and a second end, the second end extending in the second direction;
the first side member has a first end and a second end, the first end of the first side member being connected to the first end of the top member for pivotal movement with respect thereto;
the bottom member extends in the third direction and has a first end and a second end, the second end of the bottom member extending in the fourth direction, the second end of the bottom member being attached to the second end of the first side member for pivotal movement with respect thereto; and
the second side member having a first end and a second end, the first end of the second side member being attached to the first end of the bottom member for pivotal movement with respect thereto, and the second end of the second side member being attached to the second end of the top member for pivotal movement with respect thereto.

3. The license plate frame, according to claim 2, wherein with the frame structure in the first orientation having the first overall rectangular shape, the top member is spaced apart from the bottom member, and both the first side member and the second side member are perpendicular to both the top member and the bottom member.

4. The license plate frame, according to claim 2, wherein with the frame structure in second orientation having the folded second overall rectangular shape, a portion of the top member is located adjacent to a portion of the bottom member, the first side member is located adjacent to and parallel to the bottom member and the second side member is located adjacent to and parallel to the top member.

5. The license plate frame, according to claim 1, wherein in response to the frame structure moving between a first orientation and the second orientation, the frame structure moves into a parallelogram shape.

6. The license plate frame, according to claim 1, wherein the top member has a first main portion that extends between the first end to the second end of the top member, the first main portion having a first overall length measured along the first direction and the second end of the top member has a second overall length measured along the second direction, the first overall length being at least five times the second overall length, and the bottom member has a second main portion between the first end to its second end of the bottom member, the second main portion having a third overall length measured along the third direction and the second end of the bottom portion having a fourth overall length measured along the fourth direction, the third overall length being at least five times the fourth overall length.

7. The license plate frame, according to claim 6, wherein the first overall length of the first main portion is equal to the third overall length of the second main portion.

8. The license plate frame, according to claim 6, wherein the first overall length of the first main portion is six times the second overall length of the second end of the top member, and the third overall length of the second main portion is six times the fourth overall length of the second end of the bottom member.

9. The license plate frame, according to claim 2, wherein the second end of the top member defines a connecting area where the second end of the top member is connected to the second end of the second side member for pivotal movement, the second end of the top member further defining a first stop surface proximate the connecting area, and the second end of the second side member defines a second stop surface adjacent to the connecting area, the first stop surface and the second stop surface contacting one another with the frame structure pivoting in a first pivoting direction to the first orientation in which the frame structure has the first overall rectangular shape, such that with the first and second stop surfaces in contact with one another, the frame structure is prevented from further pivoting movement in the first pivoting direction.

10. The license plate frame, according to claim 2, wherein the second end of the bottom member defines a connecting area where the second end of the bottom member is connected to the second end of the first side member for pivotal movement, the second end of the bottom member further defining a stop surface proximate the connecting area, and the second end of the first side member defines a second stop surface adjacent to the connecting area, the first stop surface and the second stop surface contacting one another with the frame structure pivoting in a first pivoting direction to the first orientation in which the frame structure has the first overall rectangular shape, such that with the first and second stop surfaces in contact with one another, the frame structure is prevented from further pivoting movement in the first pivoting direction.

11. The license plate frame, according to claim 1, wherein the bottom member has a finish side and a back side, the back side having a pair of upwardly extending tabs dimensioned and shaped to receive and retain a lower edge of a license plate.

12. The license plate frame, according to claim 11, wherein the bottom member has an upper edge that extends between the finish side and the back side, the upper edge having at least one projection that extends from the upper edge over the back side of the bottom member, the at least one projection being dimensioned and positioned to extend through an opening in a lower area of the license plate.

13. The license plate frame, according to claim 1, wherein the bottom member has an upper edge that extends between a finish side and a back side, the upper edge having at least one projection that extends from the upper edge over the back side of the bottom member, the at least one projection being dimensioned and positioned to extend through an opening in a lower area of a license plate.

14. The license plate frame, according to claim 1, wherein with the frame structure in the folded second overall rectangular shape, a portion of the top member is located adjacent to a portion of the bottom member, the first side member is located adjacent to and parallel to the bottom member and the second side member is located adjacent to and parallel to the top member.

15. A license plate frame comprising:

a frame structure that includes a top member, a first side member, a bottom member and a second side member connected to one another for pivotal movement with respect to one another such that in response to pivoting movement of the top member relative to the first and second side members and pivoting movement of the bottom member relative to the first and second side members causes the frame structure to move between a first orientation wherein the frame structure has an overall rectangular shape and a second orientation wherein the frame structure has a folded overall linear shape, the top member extends in a first direction and includes a first end and a second end, the second end extending in a second direction perpendicular to the first direction;

the first side member has a first end and a second end, the first end of the first side member being connected to the first end of the top member for pivotal movement with respect thereto;

the bottom member extends in a third direction parallel to the first direction and having a first end and a second end, the second end of the bottom member extending in a fourth direction parallel to the second direction, the second end of the bottom member being attached to the second end of the first side member for pivotal movement with respect thereto; and a second side member having a first end and a second end, the first end of the second side member being attached to the first end of the bottom member for pivotal movement with respect thereto, and the second end of the second side member being attached to the second end of the top member for pivotal movement with respect thereto.

16. A license plate frame comprising:
a frame structure that includes a top member, a first side member, a bottom member and a second side member connected to one another for pivotal movement with respect to one another such that in response to pivoting movement of the top member relative to the first and second side members and pivoting movement of the bottom member relative to the first and second side members causes the frame structure to move between a first orientation wherein the frame structure has an overall rectangular shape and a second orientation wherein the frame structure has a folded overall linear shape,
the top member extending in a first direction and having an L-shape;
the first side member extending in a second direction perpendicular to the first direction and being pivotally connected to the top member and the bottom member;
the bottom member extending in a third direction parallel to the first direction and having an L-shape; and
the second side member extending in a fourth direction parallel to the second direction and being pivotally connected to the top member and the bottom member.

* * * * *